US012379844B2

(12) United States Patent
Caprì et al.

(10) Patent No.: US 12,379,844 B2
(45) Date of Patent: Aug. 5, 2025

(54) ADJUSTABLE TIMER COMPONENT FOR SEMICONDUCTOR DEVICES

(71) Applicant: Micron Technology, Inc., Boise, ID (US)

(72) Inventors: Antonino Caprì, Bergamo (IT); Emanuele Confalonieri, Segrate (IT); Simone Corbetta, Lecco (IT); Michela Spagnolo, Sesto San Giovanni (IT)

(73) Assignee: Micron Technology, Inc., Boise, ID (US)

( * ) Notice: Subject to any disclaimer, the term of this patent is extended or adjusted under 35 U.S.C. 154(b) by 161 days.

(21) Appl. No.: 17/748,644

(22) Filed: May 19, 2022

(65) Prior Publication Data

US 2022/0374150 A1 Nov. 24, 2022

Related U.S. Application Data

(60) Provisional application No. 63/191,237, filed on May 20, 2021.

(51) Int. Cl.
*G06F 3/06* (2006.01)
(52) U.S. Cl.
CPC .......... *G06F 3/0611* (2013.01); *G06F 3/0655* (2013.01); *G06F 3/0679* (2013.01)
(58) Field of Classification Search
CPC ..... G06F 3/0611; G06F 3/0655; G06F 3/0679
USPC ........................................................ 711/154
See application file for complete search history.

(56) References Cited

U.S. PATENT DOCUMENTS

| | | | |
|---|---|---|---|
| 6,385,708 B1* | 5/2002 | Stracovsky | G06F 13/1605 |
| | | | 711/158 |
| 6,453,401 B1 | 9/2002 | Barth et al. | |
| 9,442,886 B2 | 9/2016 | Lippett | |
| 10,446,215 B1* | 10/2019 | Hughes | G06F 3/0673 |
| 10,553,278 B1* | 2/2020 | Narsale | G11C 15/046 |
| 2007/0174529 A1 | 7/2007 | Rodriguez et al. | |
| 2017/0168957 A1* | 6/2017 | Christidis | G06F 12/084 |
| 2019/0188139 A1 | 6/2019 | Moritaka | |
| 2019/0317697 A1* | 10/2019 | La Fratta | G06F 3/0611 |
| 2019/0384528 A1* | 12/2019 | Grosz | G06F 3/0653 |
| 2020/0135278 A1* | 4/2020 | Palmer | G06F 3/0659 |
| 2020/0349067 A1* | 11/2020 | Syamala | G06F 12/0253 |
| 2022/0317923 A1* | 10/2022 | Balakrishnan | G06F 3/0653 |

* cited by examiner

*Primary Examiner* — Gautam Sain
(74) *Attorney, Agent, or Firm* — Brooks, Cameron & Huebsch, PLLC

(57) ABSTRACT

Systems, apparatuses, and methods related to an adjustable timer component are described. A memory device includes, a memory controller coupled to the memory device comprising an adjustable timer component. The adjustable timer component is configured to receive a timer generation request and, responsive to receiving the request, store in a cache an active timer entry corresponding to a particular first address, generate a timer corresponding to an active timer entry and the particular first address, and monitor the timer to determine when the timer expires. Responsive to the expiration of the timer, dequeue the timer entry and invalidate the timer entry stored in the cache. The memory device can also include command logic configured to, prior to issuing a second command, query the cache of the adjustable timer component to determine if the cache includes an active timer entry corresponding to the particular second address.

25 Claims, 7 Drawing Sheets

ADJUSTABLE TIMER COMPONENT FOR SEMICONDUCTOR DEVICES

This application claims the benefit of U.S. Provisional Application Ser. No. 63/191,237 filed on May 20, 2021, the contents of which are incorporated herein by reference.

BACKGROUND INFORMATION

Technical Field

The present disclosure relates generally to semiconductor memory and methods, and more particularly, to apparatuses, systems, and methods for an adjustable timer component for semiconductor devices.

Background

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes Random Access Memory (RAM), Dynamic Random Access Memory (DRAM), Static Random Access Memory (SRAM), Synchronous Dynamic Random Access Memory (SDRAM), and Thyristor Random Access Memory (TRAM), among others. Non-volatile memory can provide persistent data by retaining stored data when not powered and can include NAND flash memory, NOR flash memory, Ferroelectric Random Access Memory (FeRAM), and resistance variable memory such as Phase Change Random Access Memory (PCRAM), Resistive Random Access Memory (RRAM), and Magnetoresistive Random Access Memory (MRAM), such as Spin Torque Transfer Random Access Memory (STT RAM), among others.

A memory controller can be used to select commands for execution by a memory device. The memory controller can determine which commands are ready for execution based on a particular selection policy. In various instances, a timer may be used to determine whether a particular command can be selected for execution, since some memory devices may not function properly if a sufficient time has not elapsed between access requests to a same row of the memory device. For example, a timer may be used to monitor a delay between when a particular row closes and when the row is next opened (e.g., the precharge to activate time delay).

DETAILED DESCRIPTION

Figure 1:
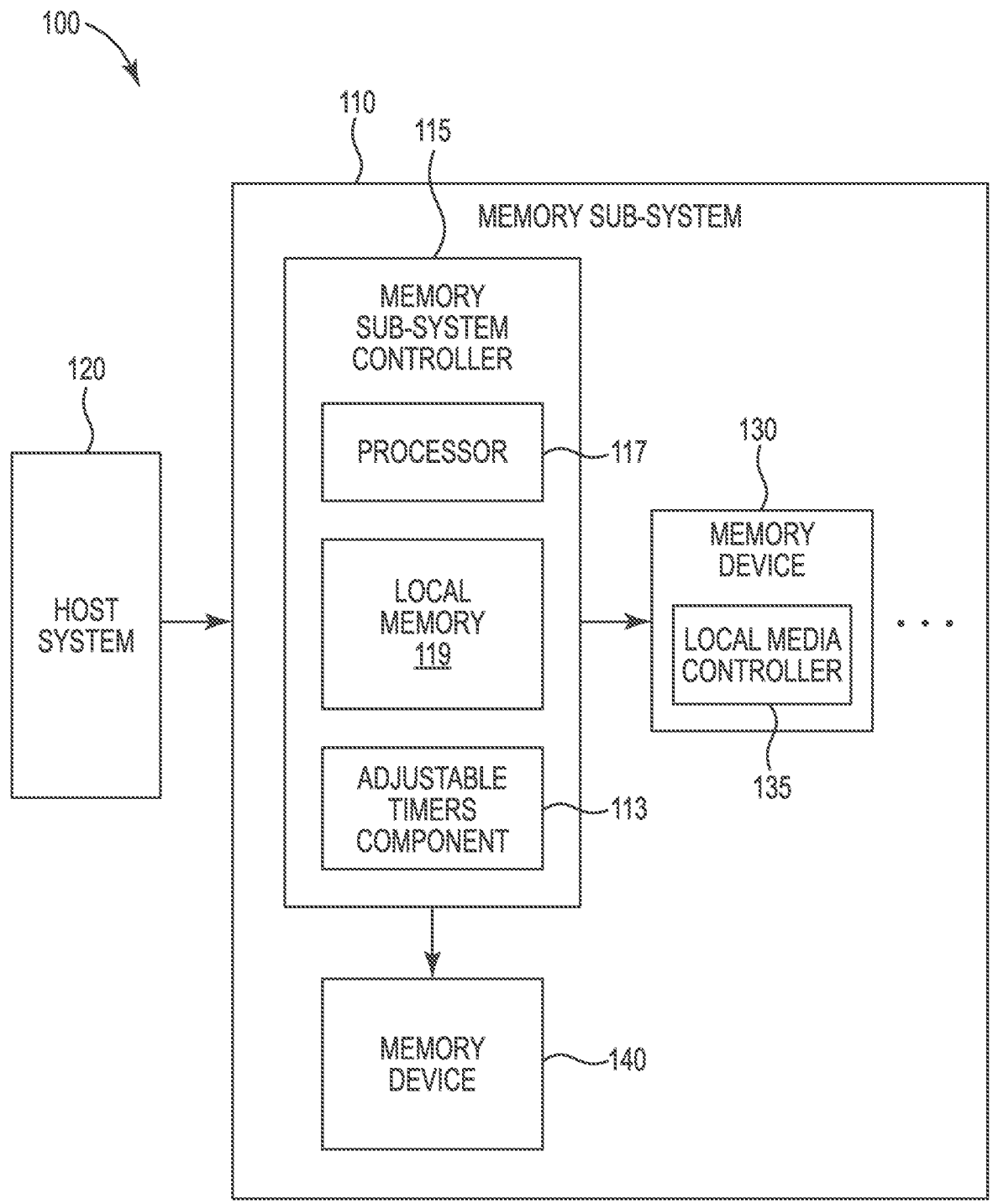
FIG. 1 illustrates an example computing system that includes a memory sub-system in accordance with some embodiments of the present disclosure

Systems, apparatuses, and methods related to an adjustable timer component for semiconductor devices are described. A controller includes an adjustable timer component to create an active timer entry when a timer generation request is received. The adjustable timer component can receive the timer generation request when a command is completed (e.g., when the execution of the command is completed). As used herein, the term "active timer entry" refers to data that sets an amount of time that must pass between completing a command in a computing system (e.g., on a memory bank, memory die, or a row of the computing system) and executing a subsequent command in the computing system. The adjustable timer component can use same address detection logic circuitry to determine whether there is an active timer entry on a row of memory to limit the number of commands that can be executed on a row of memory in a period of time. The size of a command queue for a memory device can determine the maximum amount of active timer entries that can be placed on a row of memory at one time. For example, increasing the size of the memory device can increase the maximum of number of active timer entries that can be placed on a row at one time.

Systems, apparatuses, and methods related to an adjustable timer component for semiconductor devices are described. In some embodiments, a proper delay insertion can be used to meet strict timing requirements imposed by the memory device, e.g., a minimum delay between precharging and activating the same row can be inserted for proper operation of the memory device. After a command is completed on a row, a single active timer entry can be used to ensure a delay between the time a command, e.g., a precharge event, on a row completes and the time a subsequent command, e.g., an activate event, on the same row can be issued. The length of the delay can be based on the type of memory device that is executing the command. An active timer entry can be initialized in correspondence to a precharge event of a row. The row can then be maintained in an "unavailable" state for an amount of time corresponding to the active timer entry. The row can then be activated once the active timer entry expires. As used herein, the term "expires" can refer to an active timer entry being outdated after an amount of time passes after its creation.

In some embodiments, a predefined number of active timer entries can be associated with rows of memory banks in memory devices. The predefined number of active timer entries can be determined based on the memory device coupled to the controller in which the adjustable timer component has been implemented. Therefore, the amount of active timer entries that can be created can vary based on the type of memory device coupled to a controller.

As memory systems are tasked with performing more complicated operations, multiple types of memory devices may be implemented in a memory system to store different types of data. In some approaches, last page detection can be used to set a timer on a row after a command has been completed on that row. However, various prior approaches lack the flexibility to function with different types of memory.

In contrast, embodiments described herein are directed to an adjustable timer component of a controller configured to create active timer entries for multiple types of memory devices, such as memory devices that operate according to differing sets of timing characteristics. Memory devices can include last page access detection circuitry to limit consecutive accesses to a same row. The length of the delay between consecutive access to the same row can vary based on the type of memory device being accessed. Benefits of the adjustable timer component include providing flexibility in how circuitry is built. For example, the adjustable timer component can be implemented into multiple types of controllers and used with multiple types of memory devices. The set of timing characteristics can include, at least, a Row Precharge Time (tRP). As used herein, the term "row precharge time" generally refers to the time between executing a precharge command (e.g., to close a row) and executing a subsequent activate command on the same row. By implementing the adjustable timer component into a controller to allow the controller to create and monitor active timer entries for multiple types of memory devices with differing sets of timing characteristics, less space in a memory system can be dedicated to managing the memory devices because a single controller can be used to create and monitor active timer entries for multiple memory devices instead of multiple controllers. By dedicating less space within a memory system to creating and monitoring active timer entries for the memory devices, more space within the memory system becomes available to implement components that perform different functions. Further, because some embodiments of the present disclosure are directed to a single memory controller to perform the operations described herein (as opposed to the multiple controller architectures of some approaches), issues that can arise from inadequate thermal dissipation that can be prevalent in multiple controller approaches can be mitigated.

In some embodiments, the memory system can be a Compute Express Link (CXL) compliant memory system (e.g., the memory system can include a PCIe/CXL interface). CXL is a high-speed Central Processing Unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the Peripheral Component Interconnect Express (PCIe) infrastructure, leveraging PCIe physical and electrical interfaces to provide advanced protocol in areas such as Input/Output (I/O) protocol, memory protocol (e.g., initially allowing a host to share memory with an accelerator), and coherency interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a Solid-State Drive (SSD), a flash drive, a Universal Serial Bus (USB) flash drive, an Embedded Multi-Media Controller (eMMC) drive, a Universal Flash Storage (UFS) drive, a Secure Digital (SD) card, and a Hard Disk Drive (HDD). Examples of memory modules include a Dual In-line Memory Module (DIMM), a Small Outline DIMM (SO-DIMM), and various types of Non-Volatile Dual In-line Memory Module (NVDIMM), as well as a CXL memory expander.

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, the term "coupled to" or "coupled with" can refer to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 can write and/or read data to/from the memory sub-system 110.

The host system 120 can be coupled to the memory sub-system 110 via an interface (e.g., a physical host interface). Examples of an interface can include, but are not limited to, a Serial Advanced Technology Attachment (SATA) interface, a Peripheral Component Interconnect Express (PCIe) interface, Universal Serial Bus (USB) interface, Fibre Channel, Serial Attached SCSI (SAS), Small Computer System Interface (SCSI), a Dual In-line Memory Module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface, such as CXL. The interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The interface can provide a way for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, Random Access Memory (RAM), such as Dynamic Random Access Memory (DRAM) and Synchronous Dynamic Random Access Memory (SDRAM).

Some examples of non-volatile memory devices (e.g., memory device 130) include Negative-And (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and Three-Dimensional NAND (3D NAND).

Although non-volatile memory components such as 3D cross-point array of non-volatile memory cells and NAND type memory (e.g., 2D NAND, 3D NAND) are described, the memory device 130 can be based on various other types of non-volatile memory or storage device, such as Read-Only Memory (ROM), Phase Change Memory (PCM), self-selecting memory, other chalcogenide based memories, Ferroelectric Transistor Random-Access Memory (FeTRAM), Ferroelectric Random Access Memory (FeRAM), Magneto Random Access Memory (MRAM), Spin Transfer Torque (STT)-MRAM, Conductive Bridging RAM (CBRAM), Resistive Random Access Memory (RRAM), Oxide based RRAM (OxRAM), Negative-Or (NOR) flash memory, and Electrically Erasable Programmable Read-Only Memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a Field Programmable Gate Array (FPGA), an Application Specific Integrated Circuit (ASIC), etc.), or other suitable processor.

The memory sub-system controller 115 can, include one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include Read-Only Memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and Error-Correcting Code (ECC) operations, encryption operations, caching operations, and address translations between a logical address (e.g., Logical Block Address (LBA), namespace) and a physical address (e.g., Physical Block Address (PBA)) that are associated with the memory devices 130. The memory sub-system controller 115 can further include host interface (not pictured) circuitry to communicate with the host system 120 via a physical host interface (not pictured). The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a Managed NAND (MNAND) device, such as UFS or eMMC memory.

The memory sub-system 110 includes an adjustable timer component 113. In some embodiments, the adjustable timer component 113 is located on a memory sub-system controller 115. In some embodiments, the adjustable timer component 113 is not part of the memory sub-system controller 115. The adjustable timer component 113 can be used to create and monitor active timer entries stored in a cache. In some embodiments, the memory sub-system 110 includes an adjustable timer component 113 that can create an active timer entry in response to receiving a timer generation request from a memory device. In some embodiments, the memory sub-system controller 115 includes at least a portion of the adjustable timer component 113. For example, the memory sub-system controller 115 can include a processor 117 (processing device) configured to execute instructions stored in local memory 119 for performing the operations described herein.

The adjustable timer component 113 can create an active timer entry after receiving a timer generation request. The timer generation request can include an indication that a command has been completed on a memory device, e.g., a row in a memory bank of a memory device. The active timer entry can be set to expire after a certain amount of time has passed. In the period of time between creating an active timer entry and the expiration of the active timer entry, a command cannot be executed on the row on which the active the active timer entry is applied. Once the active timer entry expires, a command can be executed on the row on which the active timer entry was applied.

Figure 2:
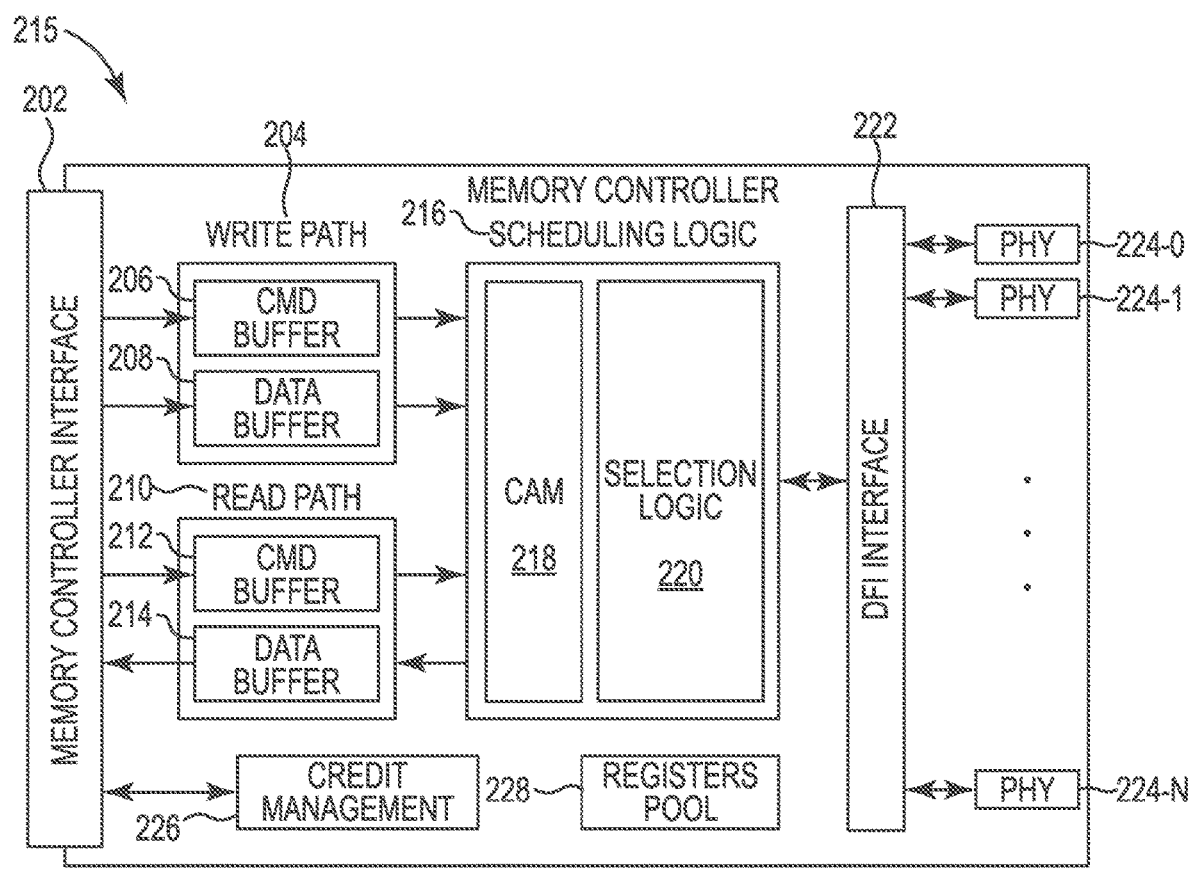
FIG. 2 is a block diagram of a portion of a controller that can be used in association with timer creation in accordance with a number of embodiments of the present disclosure.

FIG. 2 is a block diagram of a portion of a controller that can be used in association with timer creation in accordance with a number of embodiments of the present disclosure. The memory controller 215 can include a write path 204, a read path 210, scheduling logic 216, a DDR PHY Interface (DFI) Interface 222, physical (PHY) layers 224-0, 224-1, . . . , 224-N (individually or collectively referred to as PHY layers 224), credit management component 226, and a registers pool component 228. In some embodiments, the memory controller 215 can be coupled to a central controller 202, with the memory controller 215 serving as a "back end" controller coupled to memory devices via the PHY layers 224.

The memory controller 215 can receive write requests from the central controller 202 through the write path 204 and receive read requests from the central controller 202 through the read path 210. The write path 204 can include a command buffer 206 and a data buffer 208. The commands associated with write requests can be sent through the command buffer 206 and the corresponding data can be sent through the data buffer 208. The read path 210 can also include a command buffer 212 and a data buffer 214. Commands associated with read requests can be stored in the command buffer 212 prior to execution, and the data corresponding to the read requests can be provided to the central controller 202 through the data buffer 214. In some embodiments, an acknowledgement can be sent to the central controller 202 when a write request is received from the central controller 202, and the data can be written to memory according to the timing of the memory device. In some embodiments, reads can be acknowledged after the read request is completed. The read request acknowledgement can be accompanied by data.

In some embodiments, the central controller 202 can initiate the intent to perform a memory access through the credit management component 226. The credit management component 226 can be used to prevent overflow at the internal buffers (e.g., 206, 208, 212, 214). When a command is put in execution, control can be passed to the PHY layers 224 via the DFI interface 222. Commands can then be sent to the PHY layers 224 in parallel.

In some embodiments, the physical (PHY) layer 224 can couple the memory controller 215 to a plurality of memory ranks. As used herein, the term "PHY layer" generally refers to the physical layer in the Open Systems Interconnection (OSI) model of a computing system. A PHY layer 224 may be the first (e.g., lowest) layer of the OSI model and can be used transfer data over a physical data transmission medium. In some embodiments, the physical data transmission medium can be a plurality of channels (not pictured). As used herein, the term "memory rank" generally refers to a grouping of memory chips (e.g., DRAM memory chips and/or FeRAM memory chips) that can be accessed simultaneously. For example, the PHY layers 224 can correspond to respective channels, which may comprise multiple chips. The chips capable of sending/receiving data in parallel across the multiple channels can be referred to as a rank. The chips that comprise a memory rank can also share a chip select. As used herein, the term "chip select" can refer to a control line used to select one or more memory chips out of a plurality of memory chips that are connected to the same memory bus.

The scheduling logic 216 can include a Content-Addressable Memory (CAM) 218 and selection logic 220. The scheduling logic can implement a command selection policy to determine the order in which commands are selected for execution. In some embodiments, a command can be either a column command or a row command. As used herein, a "column" command refers to a command directed to an address corresponding to an open (e.g., activated) row (e.g., page) of an array of the memory device, and a "row" command refers to a command directed to an address corresponding to a closed (e.g., deactivated) row of the array. In some embodiments, an adjustable timer component (adjustable timer component 313 shown in FIG. 3) can be integrated into the scheduling logic 216 to create and monitor active timer entries corresponding to commands sent to various types of memory devices.

Figure 3:
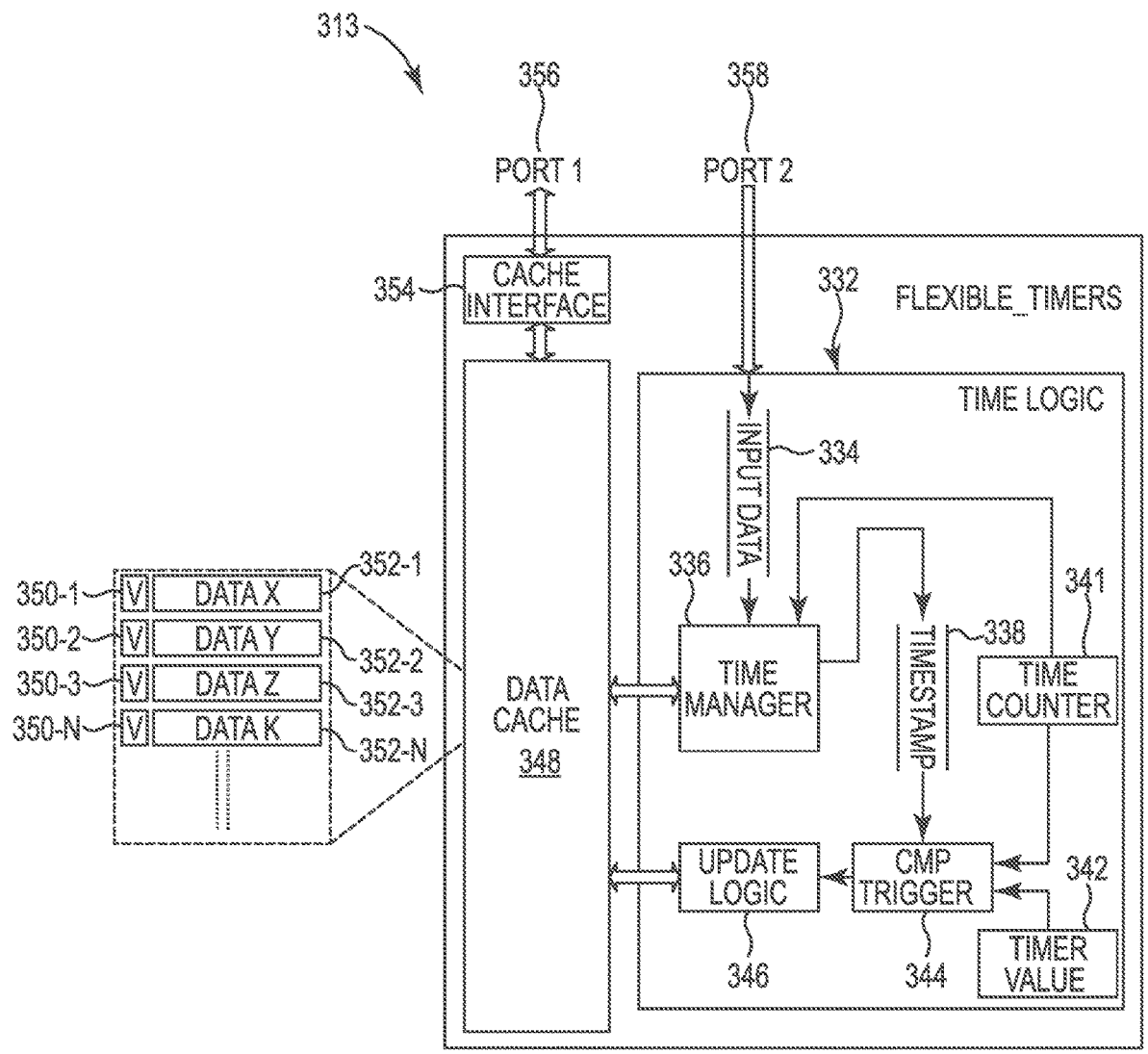
FIG. 3 illustrates a functional block diagram in the form of an adjustable timer component for semiconductor devices in accordance with a number of embodiments of the present disclosure.

FIG. 3 illustrates a functional block diagram in the form of an adjustable timer component for semiconductor devices in accordance with a number of embodiments of the present disclosure. The adjustable timer component 313 can be integrated into a memory controller (e.g., memory controller 215 of FIG. 2). The adjustable timer component 313 can include time logic portion 332, a cache 348, and a cache interface 354. The time logic portion 332 can include an input data queue 334, a time manager 336, a time stamp queue 338, a time counter 341, a timer value 342, a compare trigger 344, and update logic circuitry 346.

The input data queue 334 can hold input data received from outside circuitry. The input data can be received from the outside circuitry through a port 358. In some embodiments, the outside circuitry can be a memory device (e.g., memory device 440 in FIG. 4) or a portion of a memory controller (e.g., portion 460 in FIG. 4). In various embodiments, the input data can include a bank address of a memory bank in which a command was completed and a row address of a row in which the command was completed. Further, the input data can include an indication that a command has been completed. The input data can be transferred from the input data queue 334 to the time manager 336. In some embodiments, the input data queue 334 can hold input data related to multiple completed commands before sending the input data related to a completed command to the time manager 336. Further, in some embodiments, the input data queue can be a first in first out (FIFO) queue.

The time manager 336 can be configured to create an active timer entry when the input data is inserted in the input data queue 334. As previously stated, the input data queue 334 receiving the input data can activate the time manager 336. As used herein, the term "activating the time manager" can refer to instructing the time manager 336 to create an active timer entry for the input data. In some embodiments, the time manager 336 can create an active timer entry for a completed command after receiving a request for an active timer entry associated with the completed command.

The active timer entry can indicate an amount of time that is scheduled to pass between the completion of a command and the start of an execution of a subsequent command on a row. The subsequent command can be executed subsequent the execution of the command. In some embodiments, an active timer entry can be created for every completed command. Therefore, after the completion of a particular command, a subsequent command cannot be executed on that row until the active timer entry corresponding to the particular command expires. In some embodiments, a command can be completed on a different row than a row that includes an active timer entry.

The active timer entries can correspond to precharging a row. For example, the precharging of a row can be initiated when the active timer entry is created for that row. Every active timer entry corresponds to a row of the memory device in which the command corresponding to the active timer entry is executed. In some embodiments, the row can be unused after a precharge command for the same amount of time as a timer value of the corresponding active timer entry. In some embodiments, precharging the row (e.g., executing a precharge command) is performed to close the row. After the amount of time corresponding to a value of the active timer entry has passed, the active timer entry will expire. An active timer entry is considered expired when an amount of time associated with the timer value of the active timer entry has passed since the active timer entry was created. Once the active timer entry has expired, the row on which the active timer entry was applied can be opened. Opening the row (e.g., via execution of an activate command) allows another command to be completed on that row. The active timer entries can be used to ensure a certain amount of time passes between the execution of multiple commands in the same row of a memory bank of a memory device.

The time manager 336 can also send information to the cache 348. In some embodiments, the information can be information about a row in a memory bank of a memory device. For example, the time manager 336 can send information to the cache 348 indicating whether an active timer entry is present on a row. As will be described further herein, the information sent to the cache 348 from the time manager 336 can determine whether a query to the cache 348 will result in a hit or a miss.

The time manager 336 can create a time stamp for the input data. As used herein, the term "time stamp" can refer to a time at which an active timer entry is created. In some embodiments, the time manager 336 can apply the time stamp to the corresponding input data. The time manager 336 can enqueue (e.g., place into a queue) the input data and the corresponding time stamp in the time stamp queue 338. The time manager 336 can receive a time corresponding to the time stamp and the input time from the time counter 341, a free running counter used to indicate a passing of time.

The time stamp queue 338 can hold data comprising a variety of fields. In some embodiments, as previously stated, the time stamp queue 338 can hold the input data and the time stamp corresponding to the input data received from the time manager 336. In some embodiments, the time stamp queue 338 can be a First In, First Out (FIFO) queue. In a FIFO queue, the oldest entry in the queue can be processed before newer entries in the queue.

A compare trigger 344 can be used to compare the sum of a value of the time stamp in the time stamp queue 338 and a timer value stored in a timer value register 342 to a value of a time counter stored in a time counter 341. The result of that comparison can be sent to the cache through the update logic circuitry 346. As used herein, the term "time counter" can refer to a component used to indicate a passing of time. In some embodiments, the time counter 341 can be a free-running counter. As used herein, the term "free-running counter" can refer to a time counter that runs continuously regardless of the operations being performed by other memory components in the memory controller. For example, the value of the time counter 341 can be the value of the time stamp at the time at which the time stamp was created. The timer value stored in the timer value register 342 can be an amount of time scheduled to pass between the completion of a command and the start of the execution of a subsequent command on the same row.

In some embodiments, the result of the comparison performed by the compare trigger 344, can indicate whether an active timer entry of a row is still active or if the active timer entry has expired. For example, if the comparison performed by the comparison trigger 344 indicates that the sum of the time stamp and the timer value stored in the timer value register 342 is, at least, equal to the value of the time counter 341 at the moment the comparison is being performed, this could indicate that an amount of time corresponding to the timer value stored in the timer value register 342 has passed since the time stamp was created. Therefore, the comparison indicates that a programmed amount of time has passed since the row has completed its precharge such that a next command can be executed on the same row. However, if the comparison indicates that the sum of the time stamp and the timer value stored in the timer value register 342 does not equal (e.g., is lower than) the value of the time counter 341, this could indicate that the amount of time scheduled to pass between the completion of one command and the start of executing a subsequent command on a row has not yet passed. Therefore, the row will remain closed and no command will be performed on the row until an amount of time corresponding to the timer value stored in the timer value register 342 has passed.

The update logic circuitry 346 can be configured to invalidate (e.g., remove) the active timer entry stored in the cache 348. As stated previously, the update logic circuitry 346 can send the result of a comparison performed by the compare trigger 344 to the cache 348. By sending the result of the comparison to the cache 348, the update logic 346 can invalidate (e.g., remove) an active timer entry stored in the cache 348. For example, if the update logic circuitry 346 sends comparison results to the cache 348 indicating that scheduled amount of time to pass after the creation of an active timer entry has passed, the active timer entry can be removed from the cache 348.

The cache 348 can store data associated with the location in a memory device in which a command was executed. In some embodiments, the data stored in the data cache 348 can include a valid bit 350-1, 350-2, 350-3, . . . , 350-N (collectively referred to as valid bit 350) and the row address of the row in a memory device in which a command was executed. The valid bit 350 can be used to determine if a data entry in the cache 348 is valid (e.g., the data stored in the cache 348 is the same as the data stored in the memory device 340) or invalid (e.g., the data stored in the cache 348 was changed such that it is no longer the same as the data in the memory device 340). In some embodiments, the input data can include a valid bit 350, the row address of the row in a memory device in which the command was executed, and the command. In some embodiments, the cache 348 can store data 352-1, 352-2, 352-3, . . . , 352-N (collectively referred to as data 352) associated with the completed command. As stated previously, the cache 348 can store an active timer entry received from the time manager 336 including the resource tag, e.g., address, memory bank and row corresponding to the location in the memory device to which the active timer entry is applied. The cache can also receive an updated status of the active timer entries from the update logic circuitry 346. The cache interface 354 can be an interface that transfers data between the cache 348 and outside circuitry (e.g., controller portion 460 in FIG. 4). In some embodiments, data can be sent from the cache 348 to the outside circuitry and from the outside circuitry to the cache 348 through port 356.

In some embodiments the cache 348 can be a data cache that is able to provide requested data indicating that an active timer entry is active for a memory device (e.g., memory device 440 in FIG. 4) without accessing the memory device. In other embodiments, the cache 348 can be an SRAM that can be used to store a greater number of active timer entries than a data cache. A data cache can be a memory component that is smaller than an SRAM and data can be accessed from a data cache in less time than data can be accessed from an SRAM. Further, an SRAM can hold programs and data that are currently being accessed by the memory system and a data cache can hold data that is frequently accessed by the memory system. Characteristics of the cache 348 can change depending on whether the cache 348 is a data cache or an SRAM. For example, if the cache 348 is an SRAM, the cache 348 can have a greater size (e.g., higher memory capacity) than if the cache 348 is a data cache. However, due to the increased memory capacity in comparison to a data cache, the embodiments in which the cache 348 is an SRAM can have a higher latency than embodiments in which the cache 348 is a data cache. This higher latency can be caused by the increased time to search the larger SRAM for data in comparison to searching the smaller data cache for data. In some embodiments, the size of the cache 348 can be adjusted to adjust the number of commands that are executed in the memory device within a period of time. For example, the size (e.g., memory capacity) of the cache 348 can be increased to increase the number of commands executed in the memory device within a period of time and the size of the cache 348 can be decreased to decrease the number of commands executed in the memory device within a period of time. In some embodiments, the size of the cache 348 can correspond to the size of a corresponding memory device. This can allow the adjustable timer portion 313 to accommodate different memory types and sizes. For example, the same adjustable timer portion 313 can be implemented in a memory controller coupled to a memory device with a tRP and a memory controller coupled to a memory device with a different tRP. In some embodiments, a number of active timer entries created within a period of time is adjusted when the number of commands executed within a period of time is adjusted. For example, when the number commands that are executed in the memory device within a period of time increases, the number of active timer entries created within a period of time increases. Further, for example, when the number of commands executed in the memory device within a period of time decreases, the number of active timer entries created within a period of time decreases.

Figure 4:
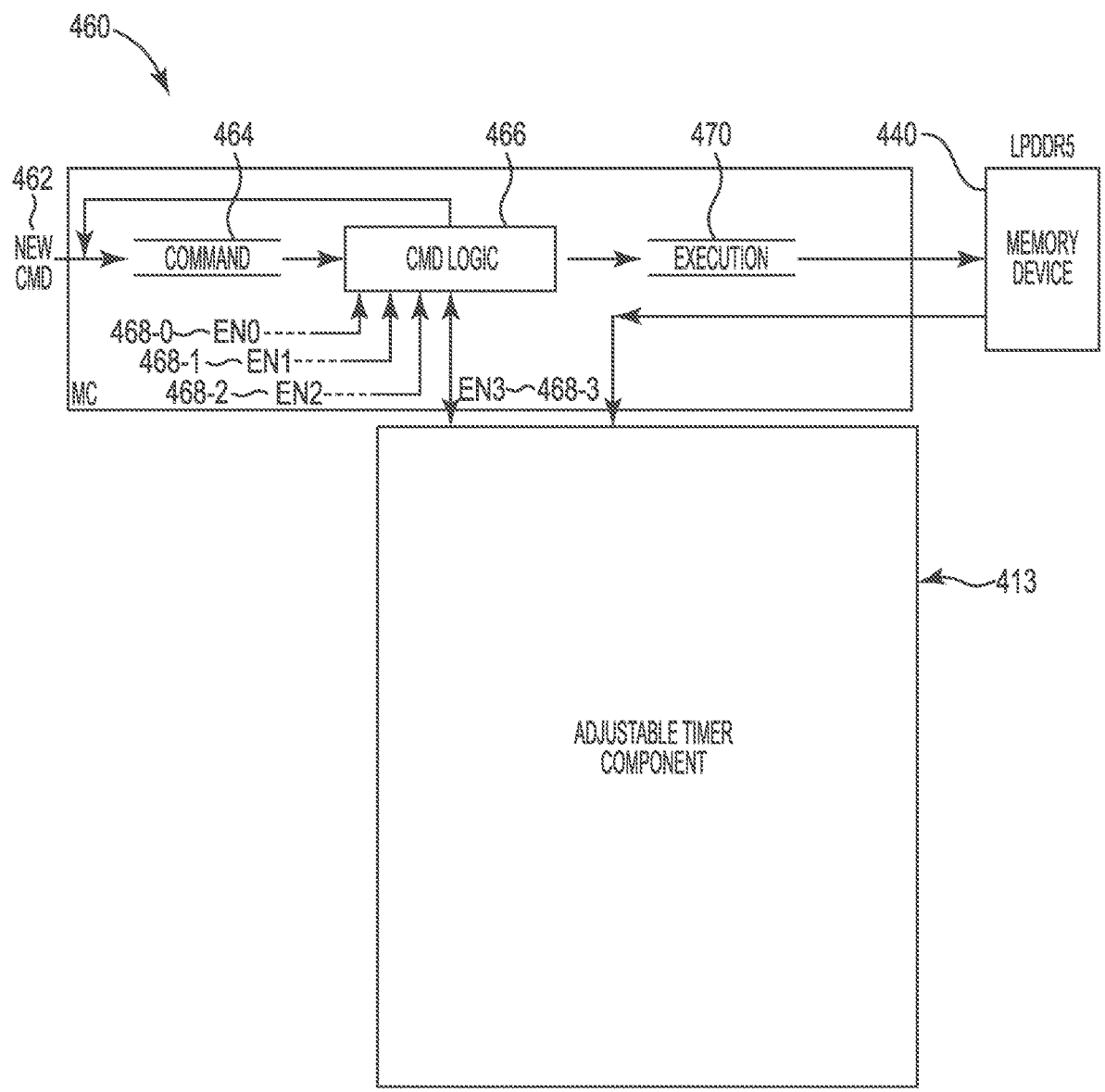
FIG. 4 illustrates a functional block diagram in the form of a memory device and an adjustable timer component in accordance with a number of embodiments of the present disclosure.

FIG. 4 illustrates a functional block diagram in the form of a memory device and an adjustable timer component for a semiconductor device in accordance with a number of embodiments of the present disclosure. FIG. 4 includes a portion 460 of a memory controller (e.g., memory controller 215 described in FIG. 2) coupled to an adjustable timer component 413, and a memory device 440 coupled to the controller portion 460. The controller portion 460 can include a command queue 464, command logic 466, and a command execution queue 470.

Adjustable timer component 413 is the same as adjustable timer component 313 described in FIG. 3. The command queue 464 can hold commands 462 received by the memory controller portion 460. The command logic 466 can select commands 462 for execution. In some embodiments, the command 462 can be sent by a host device, and in other embodiments, the command 462 can be sent from another part of a memory system. In some embodiments, the command logic 466 can select which command 462 to execute from a plurality of commands 462 held in the command queue 464. The command logic 466 can determine which command 462 to execute according to a scheduling policy. As used herein, the term "scheduling policy" can refer to algorithms for allocating computing resources to concurrent tasks allocated to a processor (e.g., a processor 117 shown in FIG. 1).

In some embodiments, the scheduling policy can be a First Come First Serve (FCFS) or First Ready-First Come First Serve (FR-FCFS) policy. An FCFS policy can include scheduling commands sent to a memory controller for execution by a main memory device (e.g., a main memory such as a DRAM device) based on the order in which the commands were received by (e.g., decoded) the controller. Therefore, the oldest commands are executed first. However, various memory systems include timing constraints that can affect whether a command can be issued or not (e.g., from the memory controller to the memory device). For example, various support circuitry associated with a memory array (e.g., row decode circuitry, column decode circuitry, sense amplifier circuitry, precharge circuitry, refresh circuitry, etc.) can include timing constraints that determine when/if a particular command is ready for execution by the memory device. An FR-FCFS policy can take into account such constraints and increase execution latency whenever newer commands may be ready for issuance to the memory device (e.g., based on the timing constraints), but the command cannot be sent to the memory device until the older command is executed.

An FR-FCFS policy can reduce average latency as compared to an FCFS policy. For example, in the FR-FCFS policy, a memory controller may iterate through the command queue and select the command it encounters that is ready to be issued. Therefore, an older command not yet ready may be skipped over in favor of a newer pending command that is ready.

As an example, an FR-FCFS policy may include prioritizing column commands over row commands such that the policy includes searching the command queue for the oldest column command ready to be issued and if an issuable column command is not found, the oldest row command that is ready to be issued is selected for issuance to the memory device.

The command logic 466 can include enable pins 468-0, 468-1, 468-2, 406-3 (individually or collectively referred to as enable pins 468) that can be used to implement the scheduling policy. The enable pins 468 can be used in association with the scheduling policy and allow the command logic to monitor different characteristics of the memory device 440. These characteristics can include, at least, whether a row is busy, whether a row is awaiting a precharge command, and whether a row is awaiting an activate command.

In some embodiments, after a command 462 is completed on memory device 440, an active timer entry can be created and associated with the row on which the command 462 was executed such that a subsequent command cannot be executed on that row until the active timer entry expires. Once the active timer entry corresponding to the command 462 expires, the command logic 466 can issue a next (e.g., subsequent) command 462. In some embodiments, prior to issuing a subsequent command 462 to a particular second address of the memory device 440 for execution, the command logic 466 can be configured to query the cache (e.g., cache 348 shown in FIG. 3) of the adjustable timer component 413 to determine if the cache includes an active timer entry corresponding to that particular second address. Data and queries can be transferred between the command logic 466 and the cache through the cache interface 454. The command logic 466 can be further configured to issue the particular subsequent command 462 to the memory device 440 responsive to determining that the cache does not include an active timer entry corresponding to the particular second address. In some embodiments, the particular second address can be the same address as the particular first address such that the command logic 466 is further configured to delay issuing the particular subsequent command 462 to the memory device 440 responsive to determining that the cache includes the active timer entry. In some embodiments, the command 462 corresponding to the particular first address is a precharge command and the timer expiration is based on a minimum amount of time to precharge a row before activating the row in the memory device 440.

In some embodiments, the cache can be sized based on a type of the memory device 440 of the memory subsystem. For example, if the memory device 440 is an LPDDR5 memory device with 16 banks per device, the cache can have N cache elements, e.g., sixteen cache elements, corresponding sixteen banks memory, one for each bank). In some embodiments, each cache element is identifiable by a bank address and a row address.

Figure 5:
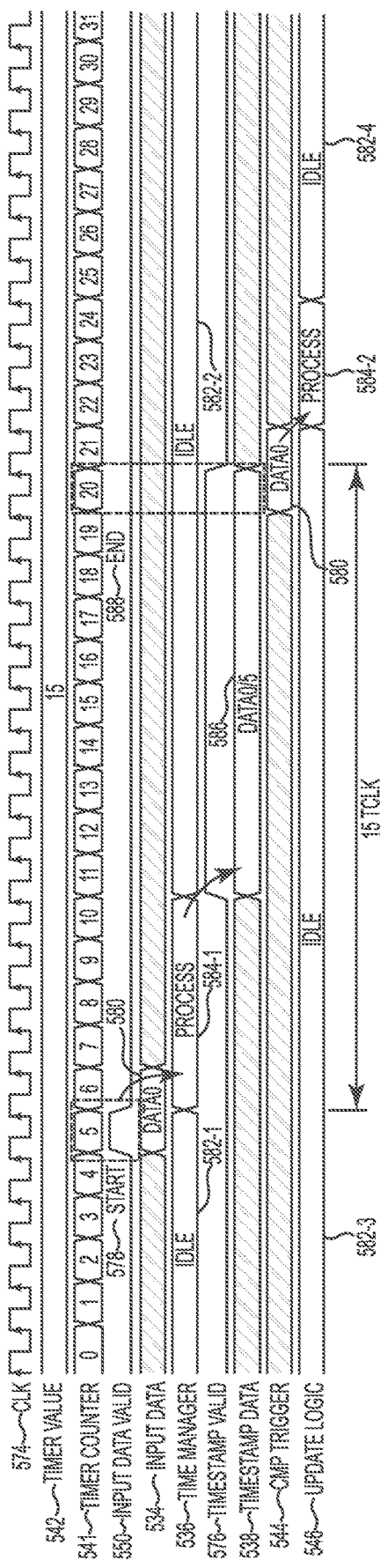
FIG. 5 illustrates a timing diagram for an adjustable timer component in a semiconductor device in accordance with a number of embodiments of the present disclosure.

FIG. 5 illustrates a timing diagram for an adjustable timer component in a semiconductor device in accordance with a number of embodiments of the present disclosure. FIG. 5 includes various signals associated with operating an adjustable timer component. The example shown in FIG. 5 includes a clock signal 574, a timer value 542, a time counter 541, an input data valid bit 550, an input data 534, a time manager 536, a time stamp valid bit 576, a time stamp 538, a compare trigger 544, and update logic 546. Each created timer expires after timer value 542*clock cycles (e.g., fifteen clock cycles).

The time counter 541 can be configured to maintain a free-running count based on the clock cycles of the clock signal 574. Further, a signal that is different from the clock signal can indicate a time (e.g., start time 578) at which input data was received by the adjustable timer component (e.g., adjustable timer component 413 in FIG. 4). In the example illustrated in FIG. 5, value of the start time 578 is five (e.g., a sixth clock cycle from the moment that the time counter 541 starts tracking the clock 574). In the example illustrated in FIG. 5, when the value of the time counter 541 is five, the time manager 536 can place a time stamp on the input data 580. As shown in FIG. 5, the time manager 536 can be in an idle state 582-1, 582-2 or a process state 584. In the example illustrated in FIG. 5, the time manager 536 can be in a first idle state 582-1 before receiving the input data 580. The first idle state 582-1 can be a state in which the time manager 536 is not placing a time stamp on the input data 580 or placing the updated input data 586 in the time stamp queue 538. After receiving the input data 580, the time manager 536 can be in a first process state 584-1. While in the first process state 584-1, the time manager 536 can place a time stamp on the input data 580. Once the time stamp is placed on the input data 580, the input data 580 becomes the updated input data 586. The updated input data 586 can be placed in the time stamp queue 538.

In the example timing diagram shown in FIG. 5, when the value of the time counter 541 is twenty, the compare trigger 544 can compare the sum of the timer value 542 and the time stamp to the value of the time counter 541. If the sum of timer value 542 and the time stamp is equal to, or larger than, the value of the time counter 541, the update logic 546 can invalidate and dequeue a corresponding active timer entry stored in the cache (e.g., cache in FIG. 4). For example, as shown in FIG. 5, a timer value 542 can be programmed to be fifteen clock cycles. The value of the time counter 541 at the time 578 can be a time at which the adjustable timer component receives the input data 580. In this example, the value of the time counter 541 when the adjustable timer component receives the input data 580 is five. If the compare trigger 544 performs a comparison at the time 578, the sum of the timer value 542 and the time stamp would not equal the value of the time counter 541. Therefore, the updated input data 586 would be enqueued, or remain enqueued if the updated input data 586 has already been enqueued, in the time stamp queue 538. At time 588, an amount of time corresponding to the timer value 542 has passed since the time stamp was placed on the input data 580. At time 588, the value of the time counter 541 is twenty. A comparison performed by the compare trigger 544 would indicate that the sum of the time stamp and the timer value 542 would be equal to the value the time counter 541 at time 588. This indicates that an amount of time corresponding to the timer value 542 has passed since the adjustable timer component has received the input data 580 at time 578. Therefore, the update logic 546 will invalidate the corresponding active timer entry in the cache and dequeue the input data 580 in the input data queue 534.

The update logic 546 can be in an idle state 582-3 when it is not updating the status of an active timer entry the cache. While the update logic is updating the status of the active timer entry in the cache, the update logic can be in a process state 584-2. Once the update logic 546 updates the status of the active timer entry in the cache, the update logic can return to an idle state 582-4.

Figure 6:
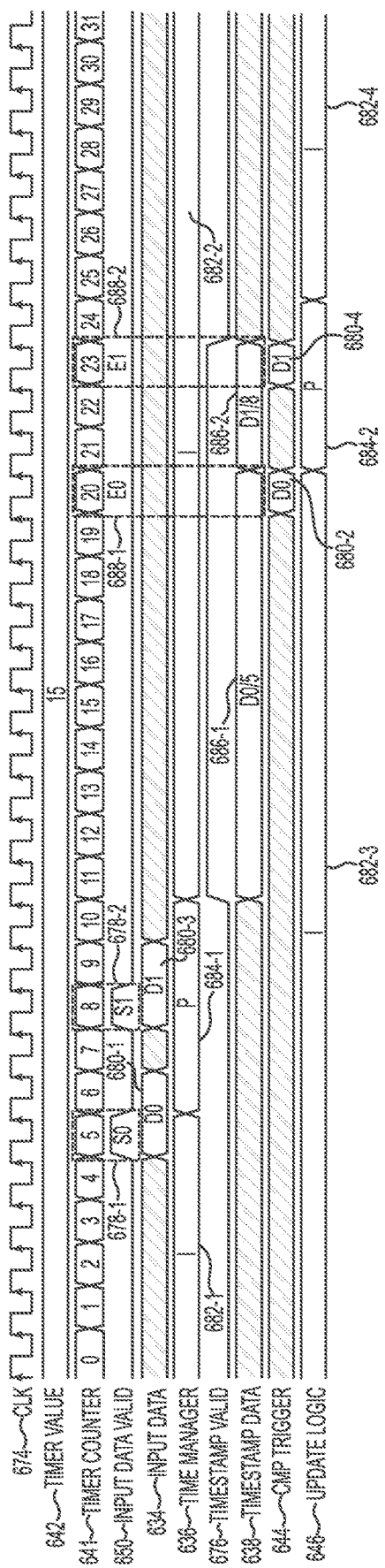
FIG. 6 illustrates another timing diagram for an adjustable timer component in a semiconductor device in accordance with a number of embodiments of the present disclosure.

FIG. 6 illustrates another timing diagram for an adjustable timer component in a semiconductor device in accordance with a number of embodiments of the present disclosure.

FIG. 6 includes the signals of the timing diagram illustrated in FIG. 5. However, FIG. 6 illustrates a timing diagram with two active timer entries in contrast to the single timer entry illustrated in FIG. 5.

At a first time counter value 678-1, an adjustable timer component (e.g., adjustable timer component 413 shown in FIG. 4) can receive a first input data 680-1 and, at a second time counter value 678-2, the adjustable timer component can receive a second input data 680-3. For example, as shown in FIG. 6, the first time counter value 678-1 can be five and the second timer value 678-2 can be eight. The first input data 680-1 and the second input data 680-2 can include data corresponding to the execution of a command and a subsequent command, respectively.

In some embodiments, the input data queue 634 can hold the first input data 680-1 and the second input data 680-2 simultaneously. The time manager 636 can place a time stamp on the first input data 680-1 in the input data queue 634 and a time stamp on the second input data 680-2 in the input data queue 634. The time manager 636 can place a first active timer entry corresponding to the first input data 680-1 and a second active timer entry corresponding to the second input data 680-2 in the cache (e.g., cache 338 shown in FIG. 3). The time manager 636 can place the first input data 680-1 and the second input data 680-2 in the time stamp queue 638. In some embodiments, the time stamp queue 638 can hold the first input data 680-1 and the second data simultaneously.

As stated previously, the time stamp queue 638 can be a FIFO queue. Therefore, the comparison trigger 644 can perform a comparison on the first input data 680-1 before performing a comparison on the second input data 680-2. In the example shown in FIG. 6, the comparison trigger 644 can compare the sum of the timer value 642 and the time stamp placed on the first input data 680-1 to the time counter value 688-1 of 20. In this example, the time stamp of the first input data 680-1 has a value of 5 and the timer value 642 is 15. Therefore, the sum of the timer value 642 and the time stamp of the first input data 680-1 is 20, which is the time counter value 688-1 at the time of the comparison. Therefore, the scheduled amount of time (e.g., the time corresponding to the timer value 642) has passed since the time stamp corresponding to the first input data 680-1 was created and the active timer entry corresponding to the first input data 680-1 is invalidated and removed from the cache. Further, the first input data 680-1 is removed from the time stamp queue 638.

Further, as shown in FIG. 6, the comparison trigger 644 can compare the sum of the timer value 642 and the time stamp placed on the second input data 680-2 to the time counter value 688-2 of twenty-three. In this example, the time stamp of the second input data 680-2 has a value of eight and the timer value 642 is fifteen. Therefore, the sum of the time stamp of the second input data 680-2 and the timer value 642 is twenty, which is the time counter value 688-2 at the time of the comparison. Therefore, the scheduled amount of time has passed since the time stamp corresponding to the second input data 680-2 was created and the active timer entry corresponding to the second input data 680-2 is invalidated and removed from the cache. Further, the second input data 680-2 is removed from the time stamp queue 638.

In some embodiments, the adjustable timer component can include same address logic detection circuitry to detect a status of a row in the cache. The same address detection logic circuitry can monitor the status of multiple memory banks in the cache and the status of multiple rows in the cache. The same-address detection logic circuitry can detect whether an active timer entry currently exists on a row. If an active timer entry that has not expired exists on a row, another command will not be executed on that row until that active timer entry expires. In some embodiments, the adjustable timer component includes a timer value register to indicate an amount of time that will pass between executing a command on a row and executing a subsequent command on that row.

Figure 7:
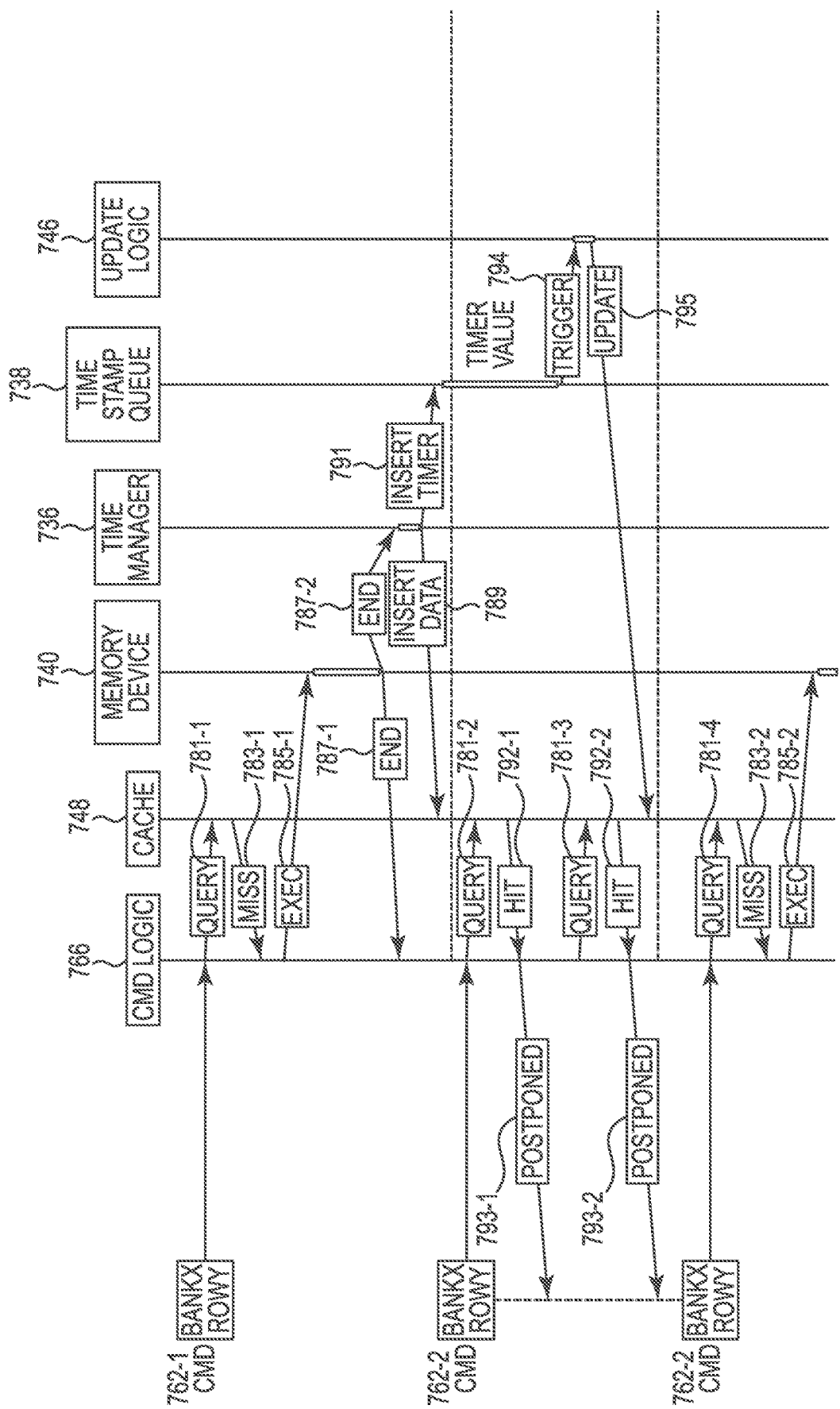
FIG. 7 illustrates a flow diagram of an example method for operating an adjustable timer component in accordance with a number of embodiments of the present disclosure.

FIG. 7 illustrates a flow diagram of an example method for operating an adjustable timer component in accordance with a number of embodiments of the present disclosure. FIG. 7 illustrates communications between various components (e.g., command logic 766, cache 748, memory device 740, time manager 736, time stamp queue 738, and update logic 746). The components can be analogous to those described above in FIGS. 3 and 4, for example.

FIG. 7 illustrates a command 762-1 directed to a particular row ("ROWY") in a particular bank ("BANKX") of a memory device 740. A host, for example, can send the command 762-1 to a command queue (e.g., command queue 464 in FIG. 4) in the memory controller (e.g., memory controller portion 460 in FIG. 4). While command 762-1 is in the command queue, the command logic 766 can perform a query 781-1 on the cache 748. In some embodiments, the command 762-1 can be a precharge command. In this example, the query 781-1 results in a miss 783-1. The miss 783-1 can indicate that the memory bank and row in which the command 762-1 is to be executed does not currently have an active timer entry associated with that memory bank and row. Therefore, the command 762-1 can be sent to the memory device 740 for execution 785-1. Upon execution of command 762-1, an indication 787-1 of command completion can be sent to the command logic 766, and an indication 787-2 of command completion can be sent to the time manager 736 (e.g., a time manager of an adjustable timer component such as adjustable timer component 413 shown in FIG. 4). Responsive to receipt of the indication 787-2, the time manager 736 can create an active timer entry corresponding to the command 762-1. The time manager 736 can provide, to the cache 748, the active timer entry corresponding to command 762-1 (e.g., as indicated by 789). The time manager 736 can also enqueue 791 an active timer entry in the time stamp queue 738. The entry in the time stamp queue 738 will include a time stamp corresponding to when the entry corresponding to command 762-1 entered the queue 738.

As shown in FIG. 7, the command logic 766 receives a subsequent command 762-2 directed to the same row ("ROWY") and bank ("BANKY"). In some embodiments, the command 762-2 can be an activate command. The command logic 766 performs a query 781-2 on the cache 748 (e.g., to determine whether an active timer entry corresponding to the address is present). In this example, the query 781-2 results in a cache "hit" 792-1 since the cache already includes an active timer entry corresponding to the address (e.g., the active timer entry corresponding to command 762-1 has not expired). Responsive to the cache hit 792-1, the execution of the command 762-2 is postponed 793-1 (e.g., by being returned to a command queue such as command queue 464 shown in FIG. 4). As shown in FIG. 7, a subsequent query 781-3 of the cache 748 is performed after the postponement 793-1 of command 762-2 due to the cache hit 792-1. Since the active timer entry corresponding to command 762-1 has not yet expired, the query 781-3 also results in a cache hit 792-2 and command 762-2 is again postponed 793-2.

As illustrated in FIG. 7, a subsequent query 781-4 of the cache 748 is performed after postponement 793-2 of command 762-2 due to the cache hit 792-2. In this case, the query 781-4 results in a cache miss 783-2 since the active timer entry corresponding to command 762-1 has now expired. As described above, compare trigger circuitry (e.g., compare trigger 344 shown in FIG. 3 or 444 shown in FIG. 4) can be used to determine expiration of the active timer entry. For example, the compare trigger circuitry can compare the sum of the time stamp and the timer value to the value of the time counter. If the comparison performed by the comparison trigger indicates that the sum of the time stamp and the timer value is equal to the value of the time counter at the moment the comparison is being performed, this could indicate that an amount of time corresponding to the timer value has passed since the time stamp was created. Therefore, the active timer value has expired. Upon expiration of the active timer entry corresponding to command 762-1, an update 795 is provided from update logic 746 to remove the active timer entry from cache 748.

Since the active timer entry corresponding to command 762-1 has expired (e.g., as evidenced by the cache miss 783-2), the command logic 766 can send the command 762-2 to the memory device 740 for execution 785-2. In this manner, the subsequent command 762-2 to the same address as command 762-1 is not allowed to execute until the predetermined time (e.g., as indicated by the timer value) has passed. As described herein, various embodiments can be configurable such that the timers can be dynamically created and such that multiple active timers can be created and the amount of time delay between consecutive access to a same address (e.g., page) can be configurable.

The figures herein follow a numbering convention in which the first digit or digits correspond to the figure number and the remaining digits identify an element or component in the figure. Similar elements or components between different figures may be identified by the use of similar digits. For example, 115 may reference element "15" in FIG. 1, and a similar element may be referenced as 215 in FIG. 2. A group or plurality of similar elements or components may generally be referred to herein with a single element number. For example, a plurality of reference elements 350-1 to 350-N may be referred to generally as 350. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    a memory device; and
    a memory controller coupled to the memory device, the memory controller comprising:
        an adjustable timer component configured to:
            receive a timer generation request associated with a first command, the first command corresponding to a particular first address of the memory device;
            responsive to receiving the timer generation request:
                store, in a cache of the adjustable timer component, an active timer entry corresponding to the particular first address; and
                generate a timer corresponding to the active timer entry and to the particular first address by enqueuing, in timer logic of the adjustable timer component, the active timer entry, a time stamp, and corresponding address information;
            responsive to expiration of the timer:
                dequeue the active timer entry; and
                invalidate the active timer entry stored in the cache; and
        command logic configured to, prior to issuing a second command to a particular second address of the memory device for execution, query the cache of the adjustable timer component to determine if the cache includes the active timer entry corresponding to the particular second address, and issue the particular second command to the memory device responsive to the query occurring at a time in which a sum of the timestamp of the active timer entry and a timer value of the active timer entry is greater than or equal to an amount of time that has passed since a time counter of the adjustable timer component started tracking a clock signal, wherein the active timer entry is generated prior to the query occurring.

2. The apparatus of claim 1, wherein the particular second address is a same address as the particular first address such that the command logic is further configured to delay issuing the particular second command to the memory device responsive to determining that the cache includes the active timer entry corresponding to the particular first address.

3. The apparatus of claim 1, wherein the first command corresponding to the particular first address is a precharge command, and wherein the timer expiration is based on a minimum precharge to activate delay associated with the memory device.

4. The apparatus of claim 1, wherein the adjustable timer component comprises an input data queue configured to hold input data received from the command logic.

5. The apparatus of claim 1, wherein the adjustable timer component comprises a time manager configured to place the time stamp on input data.

6. The apparatus of claim 5, wherein the adjustable timer component comprises a time stamp queue to hold the input data and the time stamp.

7. The apparatus of claim 1, wherein the adjustable timer component comprises the time counter to indicate a time at which the first command and the second command are executed.

8. The apparatus of claim 1, wherein the adjustable timer component comprises a timer value register to indicate an amount of time that will pass between executing the first command and executing the second command.

9. The apparatus of claim 1, wherein the adjustable timer component comprises a compare trigger to:
compare the timer value of the active timer entry corresponding to the particular first address and a value of the time counter; and
compare the timer value of the active timer entry corresponding to the particular second address and the value of the time counter.

10. The apparatus of claim 1, wherein the adjustable timer component comprises update logic circuitry configured to invalidate the active timer entry corresponding to the particular first address and the active timer entry corresponding to the particular second address.

11. The apparatus of claim 1, wherein dimensions of the cache are adjusted based on a type of the memory device coupled to the memory controller.

12. A method, comprising:
receiving, by an adjustable timer component, a request associated with a first command, the first command corresponding to a particular first address of a memory device;
storing in a cache of the adjustable timer component, responsive to receiving the request, an active timer entry corresponding to the particular first address;
generating, responsive to receiving the request, a timer corresponding to the active timer entry and to the particular first address by enqueuing, in timer logic of the adjustable timer component, the active timer entry, a timestamp of the active timer entry, and corresponding address information;
dequeuing, responsive to expiration of the timer, the active timer entry;
invalidating, responsive to the expiration of the timer, the active timer entry stored in the cache;
querying, by command logic and prior to issuing a second command to a particular second address of the memory device for execution, the cache of the adjustable timer component to determine if the cache includes the active timer entry corresponding to the particular second address; and
issuing the second command to the memory device responsive to the query occurring at a time in which a sum of the time stamp of the active timer entry and a timer value of the active timer entry is greater than or equal to an amount of time that has passed since a time counter of the adjustable timer component started tracking a clock signal, wherein the active timer entry is generated prior to the query occurring.

13. The method of claim 12, further comprising storing the active timer entry corresponding to the particular first address in the cache in response to receiving a first timer generation request and storing the active timer entry corresponding to the particular second address in the cache in response to receiving a second timer generation request.

14. The method of claim 13, further comprising postponing an execution of the second command when the active timer entry corresponding to the particular first address is in the cache.

15. The method of claim 12, wherein the active timer entry corresponding to the particular first address expires when an amount of time corresponding to the timer value of the active timer entry corresponding to the particular first address passes after the active timer entry corresponding to the particular first address is created.

16. The method of claim 15, further comprising removing the active timer entry corresponding to the particular first address from the cache when the active timer entry corresponding to the particular first address expires.

17. The method of claim 12, wherein the active timer entry corresponding to the particular first address includes a valid bit and a row address of a row in the memory device in which the command was executed.

18. The method of claim 12, wherein the active timer entry corresponding to the particular first address includes a valid bit, a row address of a row in the memory device in which the command was executed, and the command.

19. The method of claim 12, further comprising sending the first command to the cache before executing the first command if a first query returns a cache hit.

20. The method of claim 19, further comprising sending the first command from the cache to the memory device if a second query returns the cache miss.

21. The method of claim 12, further comprising adjusting a size of the cache to adjust an amount of commands that are executed within a period of time.

22. The method of claim 21, further comprising adjusting an amount of active timer entries corresponding to a plurality of addresses created within the period of time when the amount of commands that are executed within the period of time is adjusted.

23. An apparatus, comprising:
timer logic, comprising:
an input data queue to hold input data received from a memory controller;
a time manager to create an active timer entry when the input data is inserted in the input data queue, attribute a time stamp to the input data, and store the active timer entry in a cache;
a time stamp queue to store the input data and the time stamp;
a timer value to set an amount of time to pass between executing a first command and executing a second command;
a time counter to indicate the amount of time that has passed between executing the first command at a first particular address and executing the second command at a second particular address, wherein the timer logic is configured to, prior to issuing the second command, query the cache to determine if the cache includes an active timer entry corresponding to the particular second address, and issue the second command to a memory device responsive to the query occurring at a time in which a sum of the time stamp of the active timer entry and a timer value of the active timer entry is greater than or equal to an amount of time that has passed since the time counter started tracking a clock signal, wherein the active timer entry is generated prior to the query occurring;
a compare trigger to compare the timer value and a value of the time counter;

update logic circuitry configured to invalidate an active timer entry corresponding to the particular first address or the active timer entry corresponding to the particular second address; and same address detection logic circuitry to detect a status of a row in the cache.

24. The apparatus of claim 23, wherein the same address detection logic circuitry monitors a status of multiple memory banks in the cache and a status of multiple rows in the cache.

25. The apparatus of claim 23, wherein the time stamp is a time at which the timer was created.

* * * * *